United States Patent
Mollica

(10) Patent No.: US 10,022,853 B1
(45) Date of Patent: Jul. 17, 2018

(54) POWER TOOLS HAVING INTEGRAL GPS-BASED LOCATING MEANS

(71) Applicant: Orazio Mollica, Etobicoke (CA)

(72) Inventor: Orazio Mollica, Etobicoke (CA)

( * ) Notice: Subject to any disclaimer, the term of this patent is extended or adjusted under 35 U.S.C. 154(b) by 0 days.

(21) Appl. No.: 15/641,394

(22) Filed: Jul. 5, 2017

(51) Int. Cl.
*G08B 1/08* (2006.01)
*B25F 5/00* (2006.01)
*H04W 4/14* (2009.01)
*G08B 13/14* (2006.01)

(52) U.S. Cl.
CPC ............... *B25F 5/00* (2013.01); *G08B 13/14* (2013.01); *G08B 13/1427* (2013.01); *H04W 4/14* (2013.01)

(58) Field of Classification Search
CPC ........ G06F 12/02; G06F 12/023; G06F 9/445; G06F 9/44505; H04L 29/06; H04L 67/12; H04L 67/16; H04L 69/03; H04L 69/08; G08B 13/14; G08B 14/1409; G08B 13/1427; G05B 9/03; B25F 5/00
See application file for complete search history.

(56) References Cited

U.S. PATENT DOCUMENTS

| | | | |
|---|---|---|---|
| D419,413 S | 1/2000 | Heun | |
| 7,336,181 B2 | 2/2008 | Nowak | |
| 7,855,679 B1 | 12/2010 | Braiman | |
| 8,412,179 B2* | 4/2013 | Gerold | B25C 1/08 318/114 |
| 9,430,370 B2* | 8/2016 | Mergener | G06F 12/023 |
| 9,466,198 B2 | 10/2016 | Burch | |
| 9,467,862 B2 | 10/2016 | Zeiler | |
| 2012/0111589 A1 | 5/2012 | Schmidt | |
| 2015/0097674 A1 | 4/2015 | Mondal | |
| 2016/0375570 A1* | 12/2016 | Boeck | B24B 23/028 700/169 |
| 2017/0008159 A1* | 1/2017 | Boeck | B25F 5/00 |
| 2017/0300406 A1* | 10/2017 | Mergener | H04L 67/12 |

FOREIGN PATENT DOCUMENTS

WO 2013063507 5/2013

* cited by examiner

*Primary Examiner* — Van Trieu

(57) ABSTRACT

The power tools having integral GPS-based locating means is configured for use as a power tool. The power tools having integral GPS-based locating means is configured for use with the global positioning system (GPS). The power tools having integral GPS-based locating means comprises a power tool, a tracking device, an appropriate authority, and a plurality of messages. The tracking device: 1) is contained within the power tool; and, 2) communicates with the appropriate authority by exchanging a plurality of messages. The tracking device: 1) tracks the GPS location of the power tool; and, 2) provides the GPS coordinates of the power tool to the appropriate authority through the plurality of messages.

9 Claims, 3 Drawing Sheets

POWER TOOLS HAVING INTEGRAL GPS-BASED LOCATING MEANS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of shaping including portable power driven tools, more specifically, a detail of a portable power driven tool not related to the operations performed by the portable power driven tool.

SUMMARY OF INVENTION

The power tools having integral GPS-based locating means is configured for use as a power tool. The power tools having integral GPS-based locating means is configured for use with the global positioning system (GPS). The power tools having integral GPS-based locating means comprises a power tool, a tracking device, an appropriate authority, and a plurality of messages. The tracking device: 1) is contained within the power tool; and, 2) communicates with the appropriate authority by exchanging a plurality of messages. The power tool is an electrically operated mechanical device that is designed to repeatedly perform a task without significant sacrifice or consumption of the mechanical resources provided by the power tool. This definition is intended to allow for the depletion of chemical potential energy contained within a rechargeable battery. This definition is further intended to correspond to the vernacular usage of the term power tool. The tracking device: 1) tracks the GPS location of the power tool; and, 2) provides the GPS coordinates of the power tool to the appropriate authority through the plurality of messages.

These together with additional objects, features and advantages of the power tools having integral GPS-based locating means will be readily apparent to those of ordinary skill in the art upon reading the following detailed description of the presently preferred, but nonetheless illustrative, embodiments when taken in conjunction with the accompanying drawings.

In this respect, before explaining the current embodiments of the power tools having integral GPS-based locating means in detail, it is to be understood that the power tools having integral GPS-based locating means is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the power tools having integral GPS-based locating means.

It is therefore important that the claims be regarded as including such equivalent construction insofar as they do not depart from the spirit and scope of the power tools having integral GPS-based locating means. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
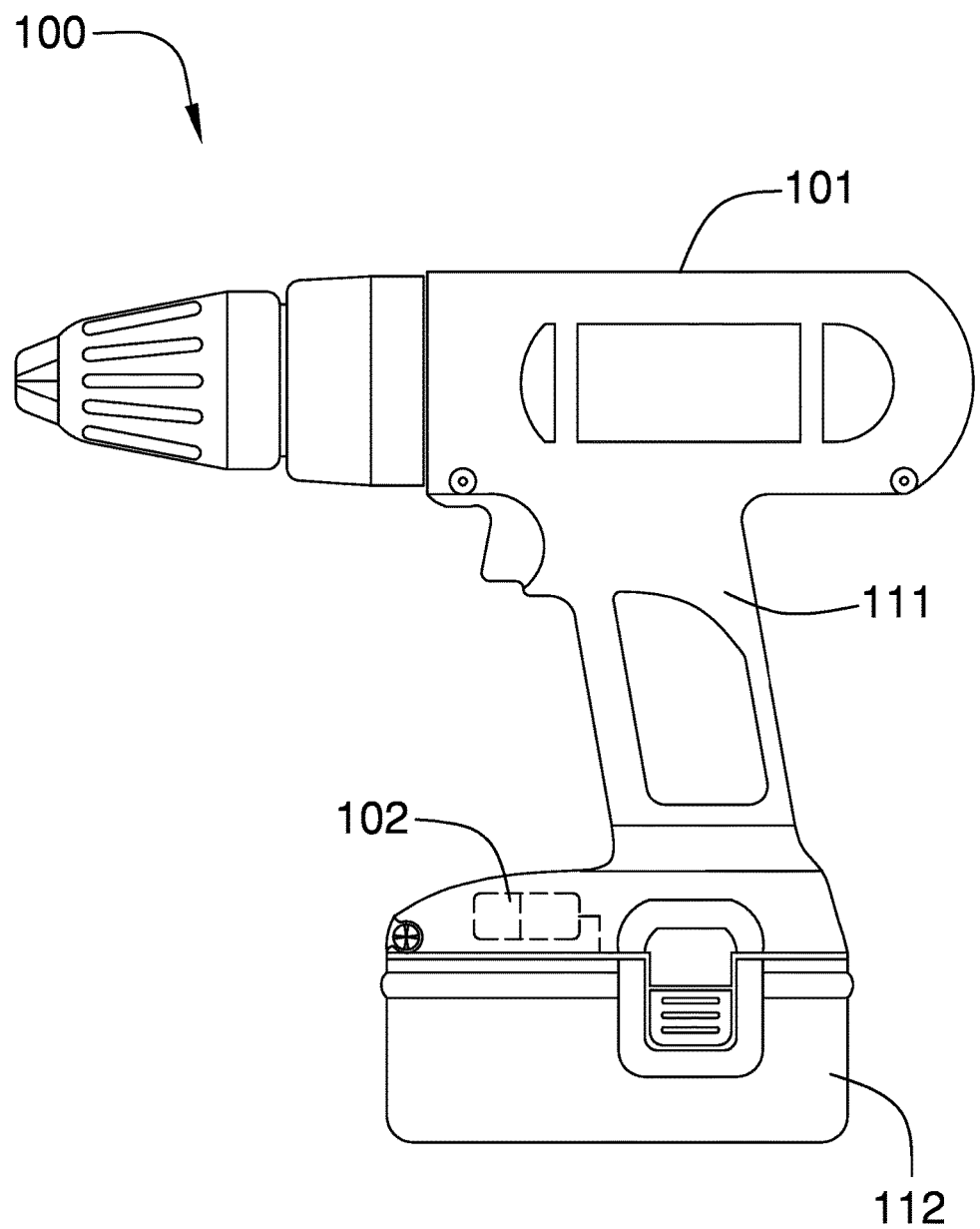
FIG. 1 is a side view of an embodiment of the disclosure.
Figure 2:
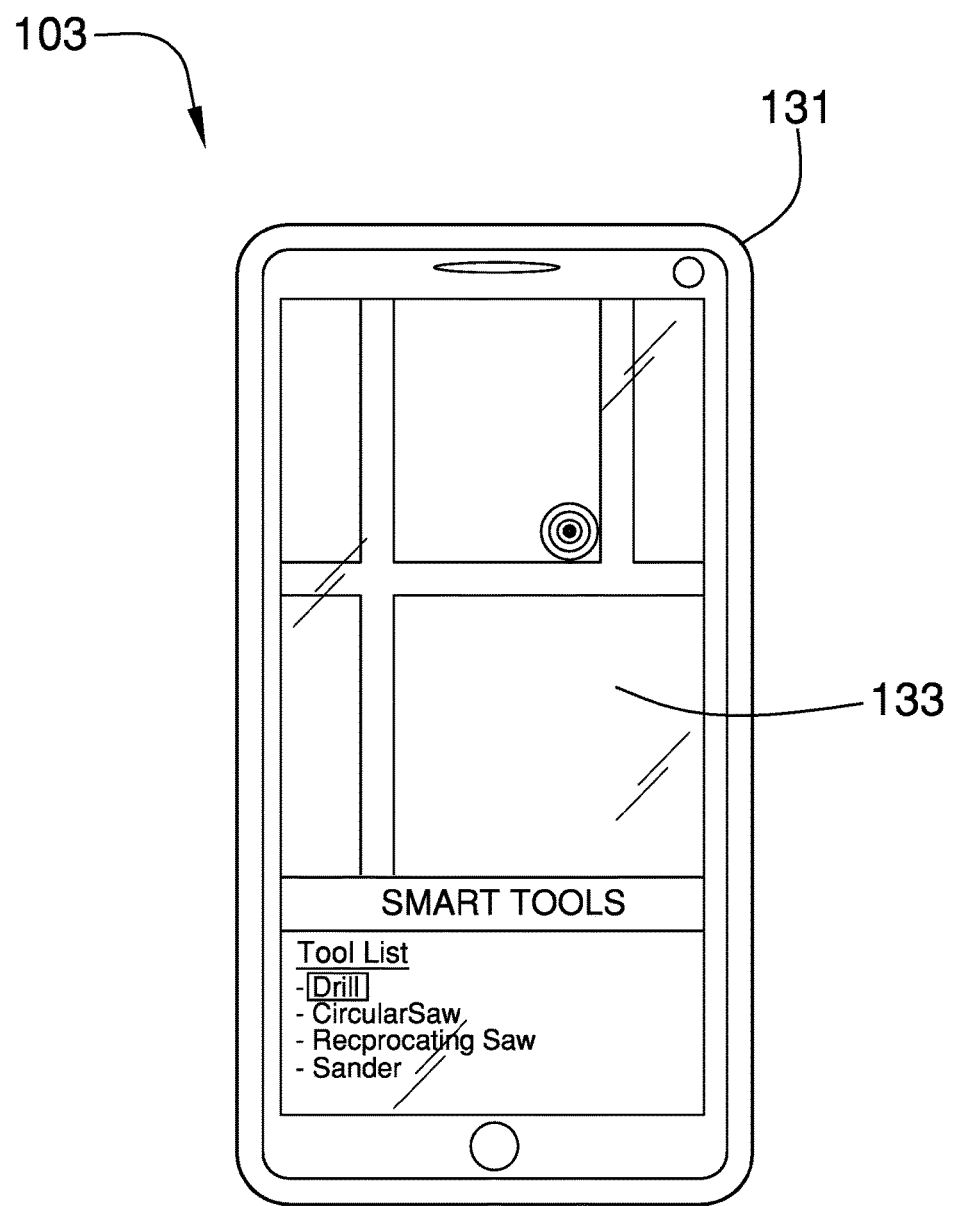
FIG. 2 is a detail view of an embodiment of the disclosure.
Figure 3:
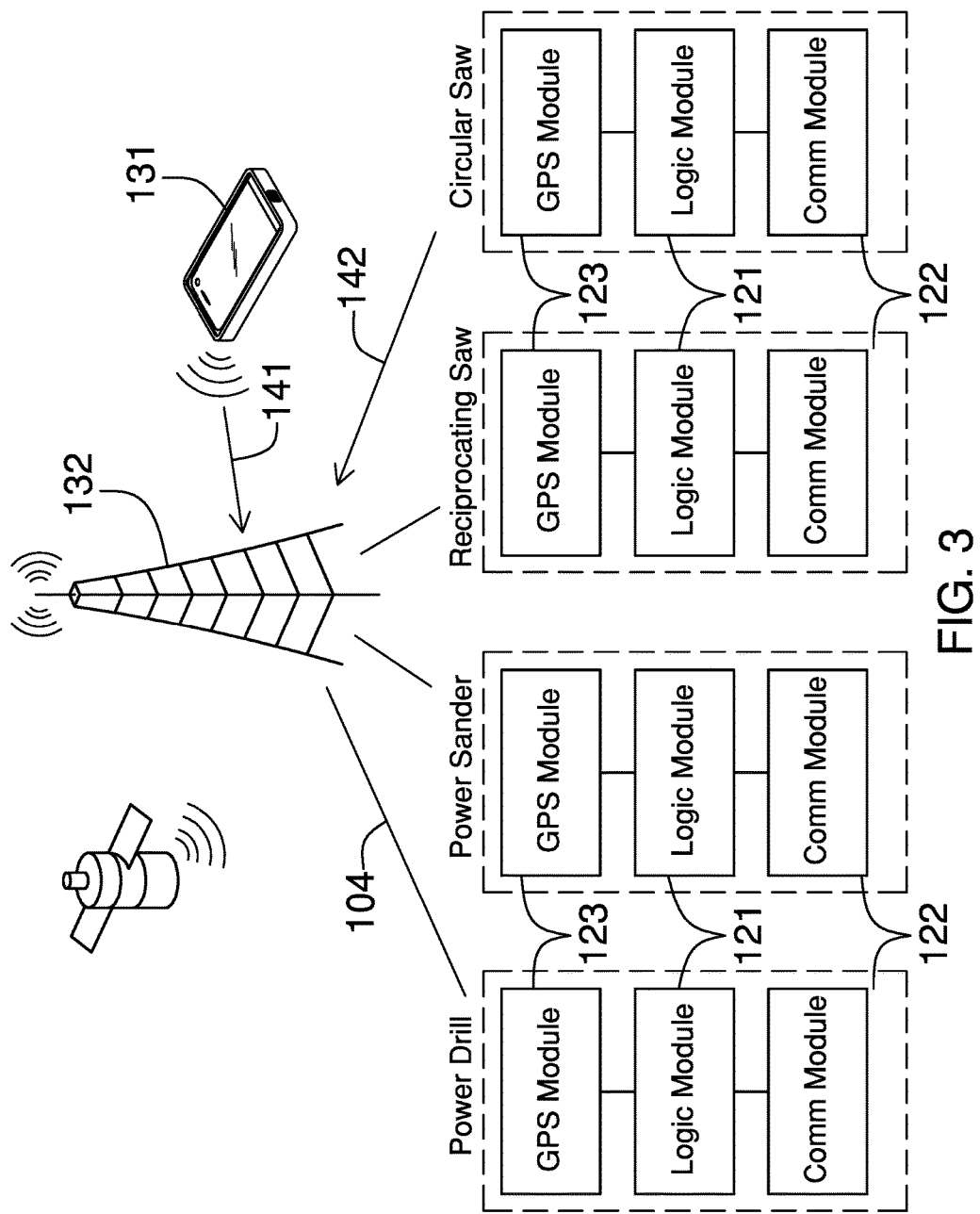
FIG. 3 is a block of an embodiment of the disclosure.

Detailed reference will now be made to one or more potential embodiments of the disclosure, which are illustrated in FIGS. 1 through 3.

The power tools having integral GPS-based locating means 100 (hereinafter invention) is configured for use as a power tool 101. The invention 100 is configured for use with the global positioning system (GPS). The invention 100 comprises a power tool 101, a tracking device 102, an appropriate authority 103, and a plurality of messages 104. The tracking device 102: 1) is contained within the power tool 101; and, 2) communicates with the appropriate authority 103 by exchanging a plurality of messages 104. The power tool 101 is an electrically operated mechanical device that is designed to repeatedly perform a task without significant sacrifice or consumption of the mechanical resources provided by the power tool 101. This definition is intended to allow for the depletion of chemical potential energy contained within a rechargeable battery. This definition is further intended to correspond to the vernacular usage of the term power tool 101. The tracking device 102: 1) tracks the GPS location of the power tool 101; and, 2) provides the GPS coordinates of the power tool 101 to the appropriate authority 103 through the plurality of messages 104.

The power tool 101 is an electrically operated mechanical device. The power tool 101 comprises an operating device 111 and a battery 112.

The operating device 111 is the element of the power tool 101 that performs the primary function of the power tool 101. Common primary functions performed by the operating device 111 include, but are not limited to: 1) an oscillating function commonly used for cutting or grinding objects; 2) a rotating function commonly used for cutting objects or drilling holes; or, 3) supporting functions such as illumination or vacuums.

The operating device 111 includes an electric motor that is powered by a battery 112. The battery 112 is a rechargeable battery that is removably attached to the power tool 101. The battery 112 is the electrical power source of the power tool 101.

The tracking device 102 is an electronic device that: 1) communicates with the GPS to determine the GPS coordinates of the tracking device 102; and 2) communicates the GPS coordinates of the tracking device 102 to the appropriate authority 103. The tracking device 102 is physically installed within the power tool 101. The operating assumption of the invention 100 is the GPS coordinates of the tracking device 102 provides the location of the power tool 101 enabling the recovery of the power tool 101 should the power tool 101 be lost or stolen.

The electrical power source used to operate the power tool 101 is further used to power the operation of the tracking device 102. The tracking device 102 remains in operation as long as the electrical power source of the power tool 101 enables the operation of the power tool 101. Stated more plainly, this direct linkage of the tracking device 102 to the energy power source of the power tool 101 means that the power tool 101 cannot be operated unless the tracking device 102 is enabled.

Another embodiment of the invention 100 is for the tracking device 102 to have a second battery (not depicted), which supplies electricity to the tracking device 102 itself. The second battery (not depicted) of the tracking device 102 would be wired to the battery 112 in order to recharge the second battery (not depicted). This embodiment would enable the tracking device 102 to operate regardless of whether the battery 112 is charged.

The tracking device 102 comprises a logic module 121, a communication module 122, and a GPS module 123.

The logic module 121 is a readily and commercially available programmable electronic device that is used to manage, regulate, and operate the tracking device 102. Depending on the specific design and the selected components, the logic module 121 can be a separate component within the tracking device 102 or the functions of the logic module 121 can be incorporated into another component within the tracking device 102. The communication module 122 is a readily and commercially available wireless electronic communication device that allows the logic module to exchange the plurality of messages 104 with the appropriate authority 103.

In the first potential embodiment of the disclosure, the communication module 122 communicates SMS and MMS messages between the logic module 121 and the appropriate authority 103 through a commercially provided and publicly available cellular wireless network 132. The use of a commercially provided and publicly available cellular wireless network 132 is preferred because: 1) of its low cost; 2) of its widespread availability and broad interoperability between competing commercially provided and publicly available cellular wireless networks 132; and, 3) methods and techniques to send SMS and MMS messages over a commercially provided and publicly available cellular wireless network 132 are well known and documented by those skilled in the electrical arts.

A viable, but less preferred alternative to the use of a commercially provided and publicly available cellular wireless networks 132 would be the use of a commercial WiFi (IEEE 802.11x) device.

The GPS module 123 is an electrical device that communicates with the GPS to determine the GPS coordinates of the GPS module 123. When queried by the logic module 121, the GPS module 123 transfers the GPS coordinates of the GPS module 123 to the logic module 121.

The operation of the tracking device 102 is described in this paragraph. In the first potential embodiment of the disclosure, the tracking device 102 receives the first SMS message 141 requesting that the GPS coordinates of the tracking device 102 be transmitted to the appropriate authority 103. The tracking device 102 communicates with the GPS to determine the GPS coordinates of the tracking device 102. The tracking device 102 then transmits the GPS coordinates of the tracking device 102 in the form of a second SMS message 142 to the appropriate authority 103 using a commercially provided and publicly available cellular wireless network 132.

The appropriate authority 103 refers to an externally provided electronic device that is used to operate the tracking device 102. The appropriate authority 103: 1) initiates the transmittal of the first SMS message 141 over the commercially provided and publicly available cellular wireless network 132 requesting the GPS coordinates of the tracking device 102; and, 2) receives and processes the second SMS message 142 containing the GPS coordinates of the tracking device 102 that is transmitted by the tracking device 102 over the commercially provided and publicly available cellular wireless network 132.

In the first potential embodiment of the disclosure, the appropriate authority 103 is a personal data device 131 that is capable of receiving and transmitting SMS messages over a commercially provided and publicly available cellular wireless network 132. The appropriate authority 103 is programmed to apply the GPS coordinates received through the second SMS message 142 to the mapping application 133 provisioned with the personal data device 131.

The appropriate authority 103 comprises a personal data device 131, a commercially provided and publicly available cellular wireless network 132, and a mapping application 133.

The personal data device 131 is a programmable electronic device that provides wireless data and communication. Before use of the invention 100 the personal data device 131 is designated as an appropriate authority 103 that is recognized and authorized to communicate with the tracking device 102.

The commercially provided and publicly available cellular wireless network 132 refers to a commercial provider of wireless telephony services that supports SMS messaging.

The mapping application 133 refers to an application provided with the personal data device 131 that provides navigation and locating services for use on the personal data device 131. The mapping application 133 provides a visual display of the GPS coordinates of the tracking device 102 in the form of a map that is displayed on the visual interface of the personal data device 131.

Each of the plurality of messages 104 is a previously determined collection of messages that comprises the received input and generates output of the tracking device 102. The plurality of messages 104 comprises a first SMS message 141 and a second SMS message 142.

The first SMS message 141 is a first message transmitted by the personal data device 131 over the commercially provided and publicly available cellular wireless network 132 to the communication module 122 of the tracking device 102 requesting the GPS coordinates of the tracking device 102.

The second SMS message 142 is a second message transmitted by the communication module 122 of the tracking device 102 over the commercially provided and publicly available cellular wireless network 132 to the personal data device 131 providing the GPS coordinates of the tracking device 102.

The following definitions were used in this disclosure:

Application or App: As used in this disclosure, an application or app is a self-contained piece of software that is especially designed or downloaded for use with a personal data device.

Appropriate Authority: As used in this disclosure, an appropriate authority is a previously determined person or organization that is designated to receive alarm or other notification messages regarding a monitored system or activity.

Battery: As used in this disclosure, a battery is a container consisting of one or more cells, in which chemical energy is converted into electricity and used as a source of power.

GPS: As used in this disclosure, depending on the context GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Hand Tools or Portable Power Tools: As used in this disclosure, a hand tool or a portable power tool is considered to be a device that is classified, or would reasonably be expected to be classified, within the Cooperative Patent Classification system in the B25 grouping.

IEEE: As used in this disclosure, the IEEE (pronounced "I triple E") is an acronym for the Institute for Electrical and Electronic Engineers.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Personal Data Device: As used in this disclosure, a personal data device is a handheld device that is used for managing personal information and communication. Examples of personal data device include, but are not limited to, cellular phones, tablets and smart phones.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

WiFi: As used in this disclosure, WiFi refers to the physical implementation of a collection of wireless electronic communication standards commonly referred to as IEEE 802.11x.

Wireless: As used in this disclosure, wireless is an adjective that is used to describe a communication channel between two terminals that does not require the use of physical cabling.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A detail of a power tool comprising:
a power tool, a tracking device, an appropriate authority, and a plurality of messages;
wherein the tracking device attaches to the power tool;
wherein the power tool communicates with the appropriate authority by exchanging the plurality of messages;
wherein the detail of a power tool is configured for use as a power tool;
wherein the detail of a power tool is configured for use with the global positioning system (GPS);
wherein the power tool is an electrically operated mechanical device;
wherein the power tool tracks the GPS location of the power tool;
wherein the power tool provides the GPS coordinates of the power tool to the appropriate authority through the plurality of messages;
wherein the power tool comprises an operating device and a battery;
wherein the operating device is the element of the power tool that performs the primary function of the power tool;
wherein the operating device comprises an electric motor that is powered by a battery;
wherein the battery is a rechargeable battery that is removably attached to the power tool;
wherein the battery is the electrical power source of the power tool;
wherein the tracking device is an electronic device;
wherein the tracking device communicates with the GPS to determine the GPS coordinates of the tracking device;
wherein the tracking device communicates the GPS coordinates of the tracking device to the appropriate authority;
wherein the tracking device is physically installed within the power tool;
wherein the electrical power source used to operate the power tool is further used to power the operation of the tracking device;

wherein the power tool cannot be operated unless the tracking device is enabled;

wherein the tracking device to have a second battery, which supplies electricity to the tracking device itself;

wherein the second battery of the tracking device is wired to the battery in order to recharge the second battery;

wherein the second battery enables the tracking device to operate regardless of whether the battery is charged;

wherein the tracking device comprises a logic module, a communication module, and a GPS module;

wherein the logic module, the communication module and the GPS module are electrically interconnected;

wherein the logic module is a programmable electronic device;

wherein the logic module manages, regulates, and operates the tracking device;

wherein the communication module is a wireless electronic communication device that enables the logic module to exchange the plurality of messages with the appropriate authority;

wherein the appropriate authority comprises an externally provided electronic device that operates the tracking device;

wherein the appropriate authority comprises a personal data device, a commercially provided and publicly available cellular wireless network, and a mapping application;

wherein the personal data device is a programmable electronic device that provides wireless data and communication;

wherein the personal data device is further capable of receiving one or more SMS messages over the commercially provided and publicly available cellular wireless network;

wherein the personal data device is further capable of transmitting one or more SMS messages over the commercially provided and publicly available cellular wireless network;

wherein the commercially provided and publicly available cellular wireless network is a commercial provider of wireless telephony services that supports SMS messaging;

wherein the mapping application is an application provided with the personal data device that provides navigation and locating services;

wherein the plurality of messages comprises a first SMS message and a second SMS message;

wherein the first SMS message is exchanged between the tracking device and the appropriate authority;

wherein the second SMS message is exchanged between the tracking device and the appropriate authority.

2. The detail of a power tool according to claim 1 wherein the communication module establishes a wireless communication link between the logic module and the appropriate authority through the commercially provided and publicly available cellular wireless network.

3. The detail of a power tool according to claim 2
wherein the GPS module is an electrical device that communicates with the GPS to determine the GPS coordinates of the GPS module;
wherein the GPS module transfers the GPS coordinates of the GPS module to the logic module.

4. The detail of a power tool according to claim 3 wherein the first SMS message is a first message transmitted by the personal data device over the commercially provided and publicly available cellular wireless network to the communication module of the tracking device requesting the GPS coordinates of the tracking device.

5. The detail of a power tool according to claim 4
wherein the appropriate authority initiates the transmittal of the first SMS message to the tracking device;
wherein the tracking device receives the first SMS message;
wherein the tracking device communicates with the GPS to determine the GPS coordinates of the tracking device.

6. The detail of a power tool according to claim 5 wherein the second SMS message is a second message transmitted by the communication module of the tracking device over the commercially provided and publicly available cellular wireless network to the personal data device providing the GPS coordinates of the tracking device.

7. The detail of a power tool according to claim 6
wherein the tracking device transmits the second SMS message to the appropriate authority;
wherein the appropriate authority receives the second SMS from the tracking device.

8. The detail of a power tool according to claim 7 wherein the appropriate authority applies the GPS coordinates received through the second SMS message to the mapping application provisioned with the personal data device.

9. The detail of a power tool according to claim 8 wherein the mapping application provides a visual display of the GPS coordinates of the tracking device in the form of a map that is displayed on the visual interface of the personal data device.

* * * * *